(12) United States Patent
Zhu et al.

(10) Patent No.: US 11,498,984 B2
(45) Date of Patent: Nov. 15, 2022

(54) METHOD FOR PREPARING VINYL ETHER POLYMER BY PHOTO-INITIATED POLYMERIZATION

(71) Applicant: SOOCHOW UNIVERSITY, Suzhou (CN)

(72) Inventors: Jian Zhu, Suzhou (CN); Xiaofei Huang, Suzhou (CN); Jiajia Li, Suzhou (CN); Na Li, Suzhou (CN); Xiangqiang Pan, Suzhou (CN); Xiulin Zhu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 184 days.

(21) Appl. No.: 16/961,909

(22) PCT Filed: Sep. 25, 2019

(86) PCT No.: PCT/CN2019/107807
§ 371 (c)(1),
(2) Date: Jul. 13, 2020

(87) PCT Pub. No.: WO2020/224169
PCT Pub. Date: Nov. 12, 2020

(65) Prior Publication Data
US 2021/0371556 A1    Dec. 2, 2021

(30) Foreign Application Priority Data
May 5, 2019   (CN) .......................... 201910368490.3

(51) Int. Cl.
*C08F 2/46*       (2006.01)
*C08F 2/50*       (2006.01)
*C08G 61/04*      (2006.01)
*C08F 116/14*     (2006.01)
*C08F 2/48*       (2006.01)

(52) U.S. Cl.
CPC .............. *C08F 116/14* (2013.01); *C08F 2/48* (2013.01)

(58) Field of Classification Search
CPC ..... C08F 116/14; C08F 116/20; C08F 116/18; C08F 2/50; C08F 2/48; C08F 4/26; C08F 16/14; C08F 2438/00
USPC ............. 522/29, 7, 6, 189, 184, 71, 1; 500/1
See application file for complete search history.

(56) References Cited

U.S. PATENT DOCUMENTS 5,147,963 A    9/1992   Plochocka et al.

FOREIGN PATENT DOCUMENTS

| CN | 1269369   A | 10/2000 |
| CN | 102627715 A | 8/2012 |
| CN | 110078852 A | 8/2019 |
| JP | H0439303  A | 2/1992 |

OTHER PUBLICATIONS

Ciftci et al, Living Cationic Polymerization of Vinyl Ethers through a Photoinduced RAdical Oxidation/Addition/Deactivation Sequence, 2017, Angew. Chem. Int. Ed 56, 519-523 (Year: 2017).*

* cited by examiner

*Primary Examiner* — Jessica Whiteley
(74) *Attorney, Agent, or Firm* — SZDC Law P.C.

(57) ABSTRACT

The invention relates to a method for preparing a vinyl ether polymer by photo-initiated polymerization, which comprises the step of: under a protective atmosphere, performing photo-initiated polymerization on a vinyl ether monomer in the presence of an organic halogenated hydrocarbon and manganese carbonyl under irradiation of light having a wavelength of 365-550 nm at −25° C. to 25° C., to obtain a vinyl ether polymer after the reaction is completed. In the method, a vinyl ether monomer is subjected to cationic polymerization in the presence of manganese carbonyl and an organic halogenated hydrocarbon under visible light, to prepare a vinyl ether polymer with controlled molecular weight and narrow molecular weight distribution.

9 Claims, 4 Drawing Sheets

METHOD FOR PREPARING VINYL ETHER POLYMER BY PHOTO-INITIATED POLYMERIZATION

This application is the National Stage Application of PCT/CN2019/107807, filed on Sep. 25, 2019, which claims priority to Chinese Patent Application No.: 201910368490.3, filed on May 5, 2019, which is incorporated by reference for all purposes as if fully set forth herein.

FIELD OF THE INVENTION

The present invention relates to the technical field of polymer preparation, and more particularly to a method for preparing a vinyl ether polymer by photo-initiated polymerization.

DESCRIPTION OF THE RELATED ART

Vinyl ether polymers have excellent flexibility, solubility and bonding performance, and are non-toxic and harmless, so they are mainly used to make adhesives, coatings, oil viscosity modifiers, plasticizers, and hair sprays, etc. The use of "living" polymerization to prepare polymers with controllable molecular weight and molecular weight distribution has always been a hot point in polymerization methodology. Since the report of living anionic polymerization in 1956, living cationic polymerization and living free radical polymerization have been developed greatly. However, due to the special structure of vinyl ether monomers in which the oxygen atom in the alkoxy group is directly attached to the double bond, this type of polymers can only be achieved by cationic polymerization. Living cationic polymerization was firstly reported in the 1980s, and many different living cationic polymerization systems have been continuously reported since then. In most of these methods, a transition metal complex is used to activate the carbon-halogen bond in a halogenated hydrocarbon to produce growing cationic species. Later, as inspired by the reversible addition-fragmentation chain transfer (RAFT) polymerization in the living free radical polymerization method, a cationic RAFT agent was synthesized. In this method, the polymerization is initiated by an added protonic acid or Lewis acid, and the polymerization is regulated by a cationic RAFT agent, thereby preparing poly(vinyl ether)s with controllable molecular weight and molecular weight distribution. In these systems, the key to achieve living polymerization lies in the use of a halogenated hydrocarbon or a cationic RAFT reagent to inhibit the concentration of growing cationic species, thereby reducing the side reactions to prepare a controlled polymer. Nevertheless, these systems are still very sensitive to the impurities such as water in the systems. In recent years, visible light as a green energy source has been widely used in various living polymerization systems. This stimulation means not only has the advantages of low energy consumption, low price and commercial availability, but more importantly, it can achieve temporal and spatial control. For example, the light duration can be used to control the degree of polymerization, or the light source can be switched on and off to achieve the proceeding and termination of the polymerization reaction. The use of photoinitiation to controllable cationic polymerization has also become an important research direction. At present, there are two main methods reported. One is to replace the Lewis acid initiator in the traditional cationic RAFT polymerization with a photosensitive onium salt initiator. The onium salt oxidizes the cationic RAFT reagent under light irradiation to produce initial cationic initiator species, and the polymerization process is similar to the traditional cationic RAFT polymerization. The other is to use the photosensitizer manganese carbonyl and a halogenated hydrocarbon to produce carbon radicals under light irradiation, which was then oxidized into carbocations by an added onium salt, thereby initiating the polymerization. In these methods, the components are complex, and additionally synthesized control reagents are required in some cases.

SUMMARY OF THE INVENTION

To solve the above technical problems, an object of the present invention is to provide a method for preparing a vinyl ether polymer by photo-initiated polymerization. In the method, a vinyl ether monomer is subjected to cationic polymerization in the presence of manganese carbonyl and an organic halogenated hydrocarbon under visible light, to prepare a vinyl ether polymer with controllable molecular weight and narrow molecular weight distribution.

For the above purpose, the present invention provides a method for preparing a vinyl ether polymer by photo-initiated polymerization, which includes the following steps:

under a protective atmosphere, performing photo-initiated polymerization on a vinyl ether monomer of Formula (1) in the presence of an organic halogenated hydrocarbon and manganese carbonyl ($Mn_2(CO)_{10}$) under irradiation of light having a wavelength of 365-550 nm at a temperature of $-25°$ C. to $25°$ C., to obtain a vinyl ether polymer after the reaction is completed,

where R is an alkyl or haloalkyl group, in which the alkyl or haloalkyl group has 1-10 carbon atoms.

Preferably, the alkyl or haloalkyl group has 2-5 carbon atoms.

Preferably, the vinyl ether monomer has a structural formula of

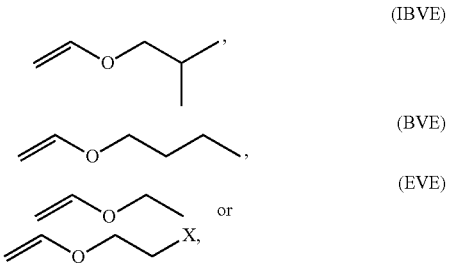

in which X is halo. More preferably, X in the vinyl ether monomer is chloro, and the vinyl ether monomer is referred to as Cl-EVE for short.

In an embodiment, the organic halogenated hydrocarbon has a structural formula of

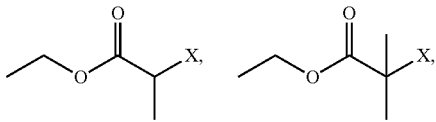

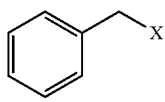 or 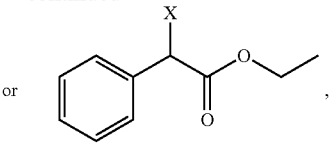, in which X is halogen.

Preferably, X in the organic halogenated hydrocarbon is bromo. That is, the organic halogenated hydrocarbon has a structural formula of

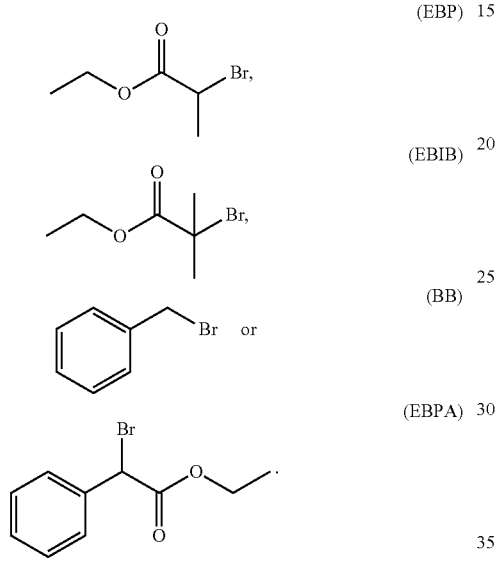

In an embodiment, the molar ratio of the vinyl ether monomer, the organic halogenated hydrocarbon and the manganese carbonyl is 100-500:1:0.01-0.5.

Preferably, the molar ratio of the vinyl ether monomer, the organic halogenated hydrocarbon and the manganese carbonyl is 200-500:1:0.05-0.5.

More preferably, the molar ratio of the vinyl ether monomer, the organic halogenated hydrocarbon and the manganese carbonyl is 200:1:0.05-0.5 or 200-500:1:0.2.

In an embodiment, the polymerization time is 5 min-5 h. Preferably, the polymerization time is 10 min-60 min. More preferably, the polymerization time is 20 min-40 min.

Preferably, the reaction temperature is 0-25° C. More preferably, the reaction temperature is 0-10° C.

Preferably, no organic solvent is used during the reaction, or the reaction may be carried out in an organic solvent.

More preferably, the organic solvent is selected from the group consisting of toluene, n-hexane, ethyl acetate, methylene chloride and any combination thereof.

In an embodiment, after the reaction is completed, the steps of dissolving the obtained polymer in tetrahydrofuran, then precipitating in methanol, filtering and drying may be further included.

Preferably, the protective atmosphere is preferably a nitrogen atmosphere.

The principle underlying the method of the present invention is as follows.

Manganese carbonyl reacts with the halogenated hydrocarbon under irradiation to produce both carbon radicals and pentacarbonylbromomanganese. Pentacarbonylbromomanganese can be used as an oxidant to directly oxidize carbon radicals into carbocations. The halogenated hydrocarbon in the system is converted through this catalytic process into carbocations to initiate the polymerization.

By virtue of the above technical solutions, the present invention has the following advantages.

The present invention provides a simple photo-initiated controlled cationic polymerization method, which is an effective method for preparing a vinyl ether polymer with a controllable molecular weight and controllable molecular weight distribution by using a catalyst generated in-situ under irradiation of light having a particular wavelength. The reagents used in this method are all commercially available and no additional purification is needed. The reaction can be performed under visible light, and have many advantages such as environmental friendliness and simple operation.

A vinyl ether polymer such as polyisobutyl vinyl ether with controllable molecular weight and narrow molecular weight distribution can be prepared by the method of the present invention.

The above description is only an overview of the technical solutions of the present invention. In order to illustrate the technical means of the present invention more clearly and implement the technical solution in accordance with the specification, the preferred embodiments of the invention are described hereinafter in more detail by reference to the accompanying drawings.

DETAILED DESCRIPTION OF THE PREFERRED EMBODIMENTS

Figure 1:
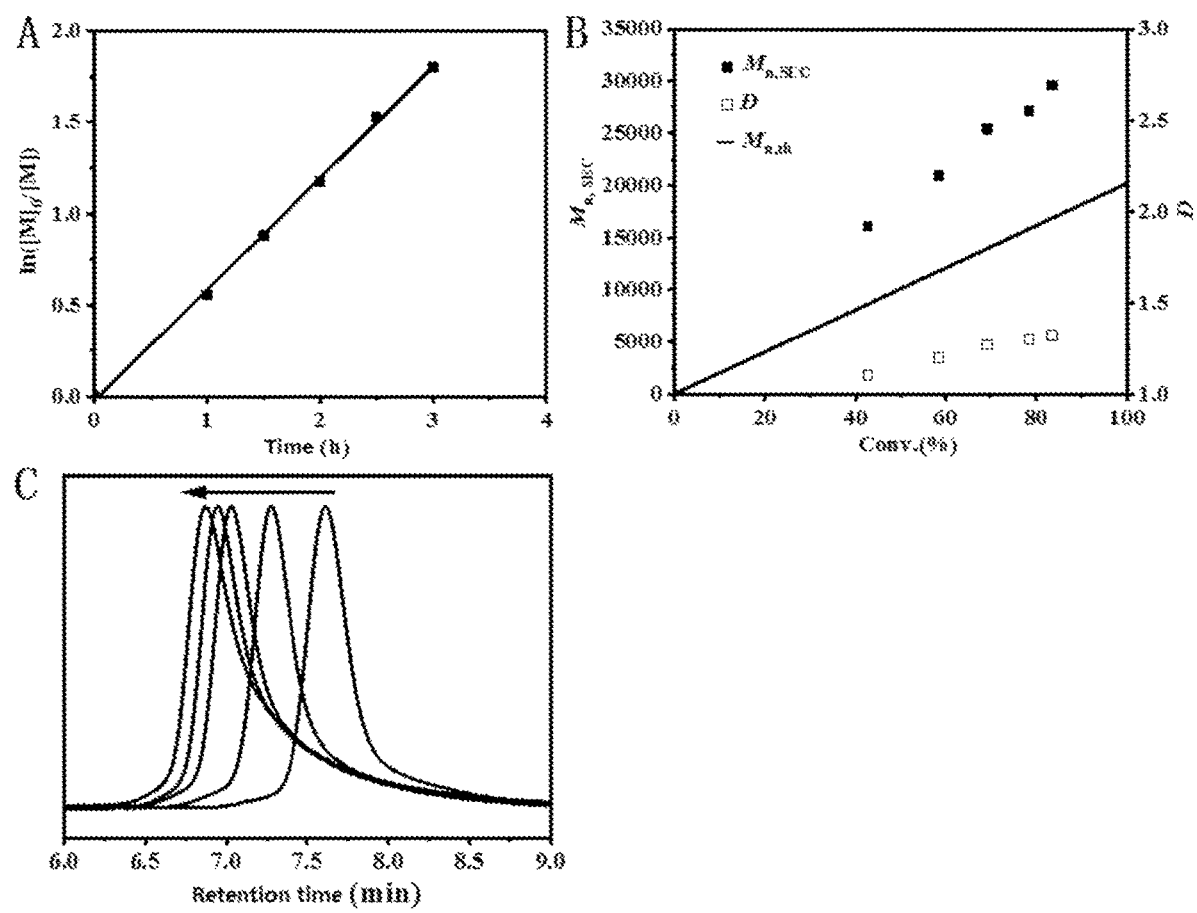
FIG. 1 shows a kinetic curve (A) at a molar ratio of $[IBVE]_0:[EBP]_0:[Mn_2(CO)_{10}]_0$ of 200:1:0.2, a change curve (B) of the monomer conversion with time, and a curve (C) of elution by GPC of the polymer.

The invention will be further illustrated in more detail with reference to the accompanying drawings and embodiments. It is noted that, the following embodiments only are intended for purposes of illustration, but are not intended to limit the scope of the present invention.

In the following examples of the present invention, the $^1H$ NMR spectrum is obtained by Bruker 300 MHz Nuclear Magnetic Resonance Spectrometer by dissolving the test sample in $CDCl_3$ as a solvent having tetramethylsilicane (TMS) as an internal standard and then testing. The molecular weight and the polydispersity index of the polymer are determined by Agilent PL-50 gel permeation chromatograph (GPC) using a refractive index detector and a PL mixed gel column D (5 μm bead size), where the molecular weight of the packing in the column ranges from 200 to $4\times10^5$ g/mol, THF is used as a mobile phase, the flow rate is 1.0 mL min-1, and the sample is injected by a PL-AS RT autosampler. The measurements are made at 40° C., and the molecular weight is calculated with polymethyl methacrylate as a standard.

Examples 1-4

Four 5 mL ampoules were taken, and the vinyl ether monomer IBVE, and the initiator halogenated hydrocarbon and manganese carbonyl were added. One kind of halogenated hydrocarbon was added to each ampoule. The molar ratio of $[IBVE]_0$:[halogenated hydrocarbon]$_0$:[manganese carbonyl]$_0$ was 200:1:0.2, and the volume of the monomer IBVE was 0.5 mL. After 3 cycles of liquid nitrogen freezing-evacuation-nitrogen filling, the ampoule was sealed under vacuum. The ampoule was allowed for reaction under irradiation of a blue LED lamp at a predetermined temperature (0° C.). After a predetermined period of time, the ampoule was opened, a small amount of tetrahydrofuran was added to dissolve the product and the resulting solution was added dropwise to a large amount of methanol for precipitation. After the precipitation was completed, the supernatant was poured off, and the polymer was dried in a vacuum oven after suction filtration. Table 1 shows the results of polymerization in the presence of various halogenated hydrocarbons under the above conditions for various periods of time. In Table 1, $M_{n,th}$ is calculated by a formula below:$[M]_0$/[halogenated hydrocarbon]$_0 \times$ conversion rate$\times M + M_{EBP}$)

TABLE 1

Results of polymerization in the presence of various halogenated hydrocarbons for various periods of time

| Example | Initiator | Time | Conversion rate (%) | $M_{n, th}$ (g/mol) | $M_{n, GPC}$ (g/mol) | Đ |
|---|---|---|---|---|---|---|
| 1 | BB | 36 h | 10.7 | 2300 | 10500 | 3.80 |
| 2 | EBPA | 16 h | 26.2 | 5400 | 24800 | 2.53 |
| 3 | EBIB | 20 min | 69.0 | 14000 | 34000 | 1.96 |
| 4 | EBP | 18 min | 93.9 | 19000 | 20600 | 1.29 |

Examples 5-14

Multiple groups of parallel experiments were performed and the vinyl ether polymers were prepared according to the method in Examples 1-4, except that the monomer was exclusively IBVE, the initiator was exclusively EBP and manganese carbonyl, and the polymerization was carried out at various molar ratios for various periods of time. The results of polymerization are shown in Table 2. In Table 2, the molar ratio refers to $[IBVE]_0/[EBP]_0/[Mn_2(CO)_{10}]_0$.

TABLE 2

Results of polymerization at various molar ratios for various periods of time

| Example | Molar ratio | Time | Conversion rate (%) | $M_{n, th}$ (g/mol) | $M_{n, GPC}$ (g/mol) | Đ |
|---|---|---|---|---|---|---|
| 5 | 200:1:0.5 | 6 min | 73.5 | 14700 | 16700 | 1.47 |
| 6 | 200:1:0.2 | 14 min | 71.6 | 14500 | 15900 | 1.18 |
| 7 | 200:1:0.1 | 15 min | 71.3 | 14300 | 18100 | 1.15 |
| 8 | 200:1:0.05 | 75 min | 81.4 | 16500 | 36100 | 1.34 |
| 9 | 200:1:0.01 | 38 h | 34.6 | 7100 | 37800 | 1.89 |
| 10 | 100:1:0.2 | 5 min | 81.8 | 8200 | 11600 | 1.41 |
| 11 | 500:1:0.2 | 50 min | 58.7 | 29400 | 32400 | 1.46 |
| 12 | 200:1:0.2 | 5 min | 90.3 | 18300 | 17800 | 1.22 |
| 13 | 200:1:0.2 | 5 h | 58.3 | 11900 | 20500 | 1.78 |

In Table 2, the reaction temperature in Examples 5-11 is 0° C.; the reaction temperature in Example 12 is 25° C., and the reaction temperature in Example 13 is −25° C.

FIG. 1 shows a kinetic curve (A) at a molar ratio of $[IBVE]_0$:$[EBP]_0$:$[Mn_2(CO)_{10}]_0$ of 200:1:0.2, a change curve (B) of the conversion rate of the monomer with time, and a curve (C) of elution by GPC of the polymer, where in figure C, from right to left, the reaction time corresponding to the curve increases one by one.

Figure 2:
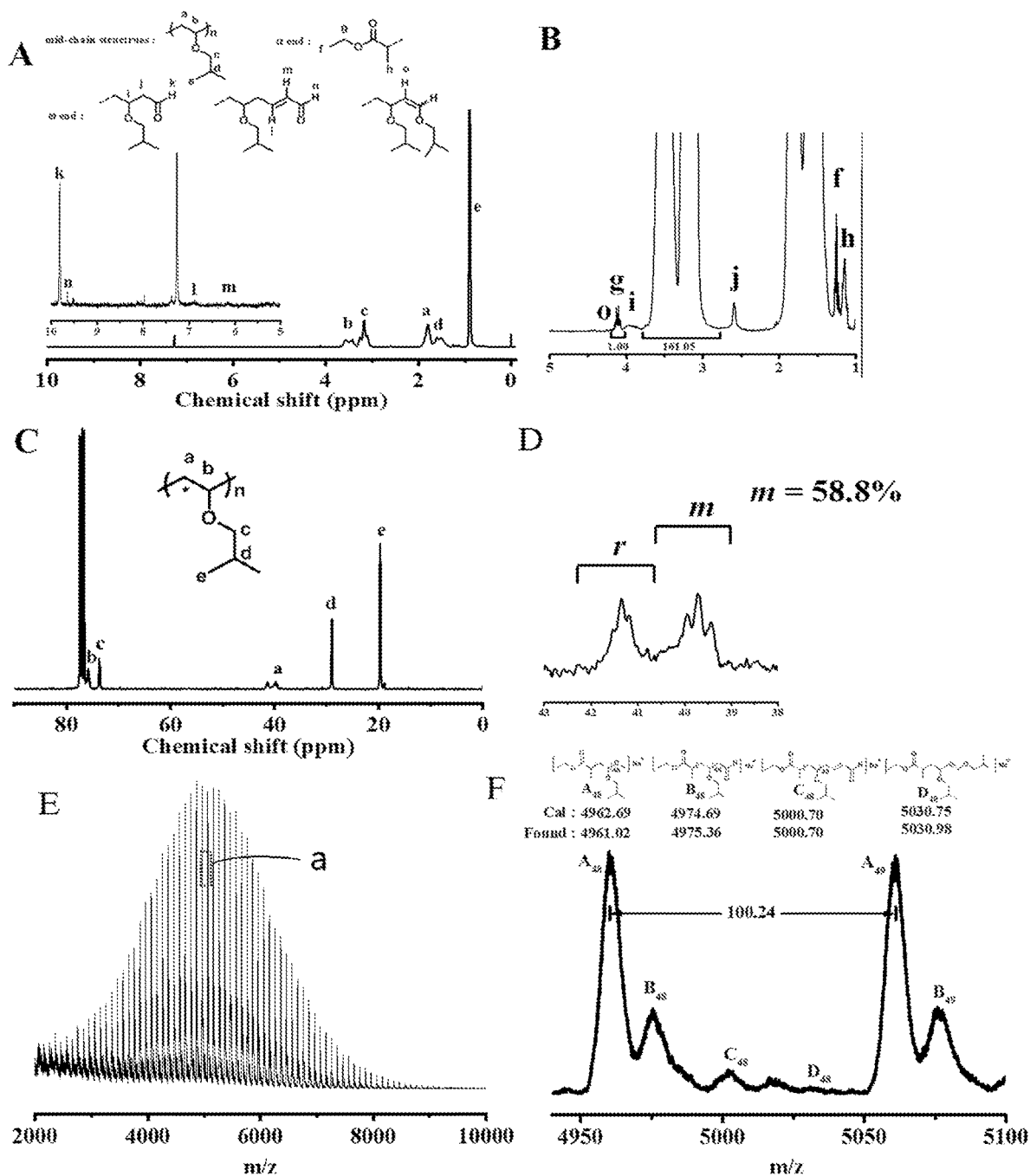
FIG. 2 shows the $^{13}C$ NMR (2A-2B), $^1H$ NMR (2C-2D) and matrix-assisted laser desorption ionization time-of-flight mass spectrometry (MALDI-ToF) mass spectrum (2E-2F) of the resulting polymer when IBVE is used as the monomer.
Figure 3:
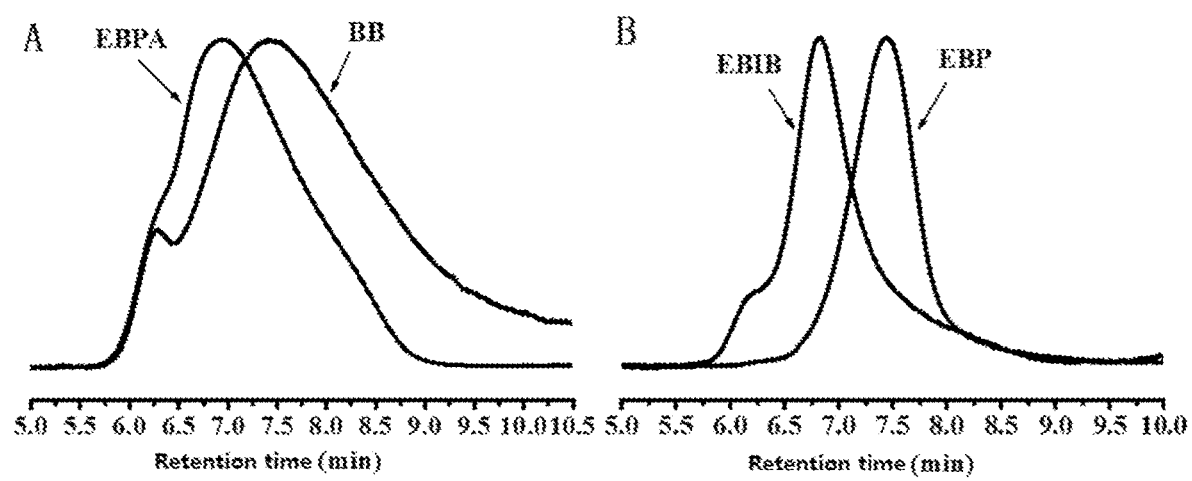
FIG. 3 shows a curve of elution by GPC of each of the polymers obtained with various halogenated hydrocarbons.
Figure 4:
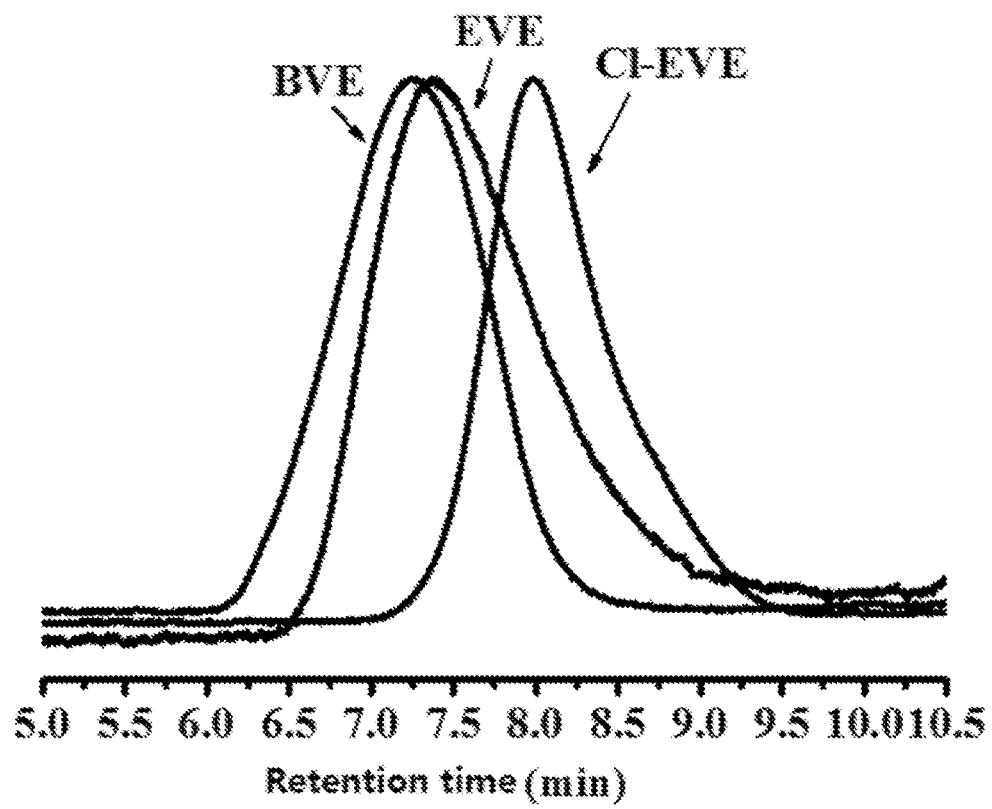
FIG. 4 shows a curve of elution by GPC of each of the polymers obtained in various solvents.
Figure 5:
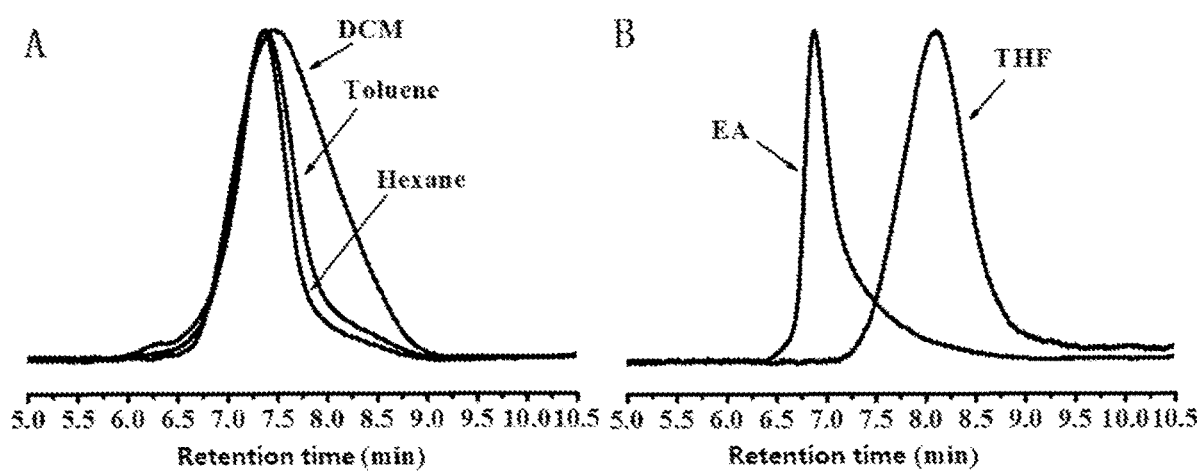
FIG. 5 shows a curve of elution by GPC of each of the polymers obtained with various monomers.

FIG. 2 shows the $^{13}$C NMR (2A-2B), $^1$H NMR (2C-2D) and MALDI-ToF mass spectrum (2E-2F) of the resulting polymer when IBVE is used as the monomer, where FIG. 2B is a partially enlarged view of 2A; FIG. 2D is a partially enlarged view of 2C; and FIG. 2F is an enlarged view of box a in 2E.

Examples 14-18

Multiple groups of parallel experiments were performed and the vinyl ether polymers were prepared according to the method in Examples 1-4, except that the monomer was exclusively IBVE, the initiator was exclusively EBP and manganese carbonyl, the molar ratio of $[IBVE]_0$:$[EBP]_0$:[manganese carbonyl]$_0$ was 200:1:0.2, an organic solvent was present in the reaction system, and the polymerization was carried out in various solvents for various periods of time. The results of polymerization are shown in Table 3.

TABLE 3

Results of polymerization in various solvents

| Example | Solvent | Time | Conversion rate (%) | $M_{n, th}$ (g/mol) | $M_{n, GPC}$ (g/mol) | Đ |
|---|---|---|---|---|---|---|
| 14 | Toluene | 40 min | 89.9 | 18200 | 21100 | 1.31 |
| 15 | DCM | 20 min | 94.6 | 19100 | 16400 | 1.31 |
| 16 | Hexane | 50 min | 83.8 | 17000 | 23200 | 1.37 |
| 17 | EA | 3 h | 81.2 | 16400 | 29600 | 1.28 |
| 18 | THF | 40 h | 18.1 | 3800 | 10500 | 1.14 |

Examples 19-21

Multiple groups of parallel experiments were performed and the vinyl ether polymers were prepared according to the method in Examples 1-4, except that various monomers were used, the initiator was exclusively EBP and manganese carbonyl, and the molar ratio of [monomer]$_0$:$[EBP]_0$:[manganese carbonyl]$_0$ is 200:1:0.2. The results of polymerization for various periods of time are shown in Table 4.

TABLE 4

Results of polymerization of various monomers

| Example | Monomer | Time | Conversion rate (%) | $M_{n, th}$ (g/mol) | $M_{n, GPC}$ (g/mol) | Đ |
|---|---|---|---|---|---|---|
| 19 | EVE | 8 min | 86.4 | 12600 | 16000 | 1.45 |
| 20 | BVE | 8 min | 78.3 | 18900 | 26500 | 1.38 |
| 21 | Cl-EVE | 50 min | 67.4 | 13700 | 9600 | 1.22 |

The above description is only preferred embodiments of the present invention and not intended to limit the present invention, it should be noted that those of ordinary skill in the art can further make various modifications and variations without departing from the technical principles of the present invention, and these modifications and variations also should be considered to be within the scope of protection of the present invention.

What is claimed is:

1. A method for preparing a vinyl ether polymer by photo-initiated polymerization, comprising a step of:

under a protective atmosphere, performing photo-initiated polymerization on a vinyl ether monomer of Formula (1) in the presence of an organic halogenated hydrocarbon and manganese carbonyl under irradiation of light having a wavelength of 365-550 nm at −25° C. to 25° C., to obtain a vinyl ether polymer after the reaction is completed,

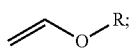 (1)

wherein R is an alkyl or haloalkyl group, in which the alkyl or haloalkyl group has 1-10 carbon atoms; and
wherein the organic halogenated hydrocarbon has a structural formula of

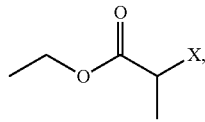

in which X is halogen.

2. The method according to claim 1, wherein the alkyl or haloalkyl group has 2-5 carbon atoms.

3. The method according to claim 1, wherein the vinyl ether monomer has a structural formula of

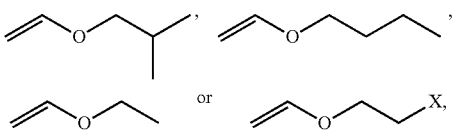

in which X is halogen.

4. The method according to claim 1, wherein the molar ratio of the vinyl ether monomer, the organic halogenated hydrocarbon and manganese carbonyl is 100-500:1:0.01-0.5.

5. The method according to claim 4, wherein the molar ratio of the vinyl ether monomer, the organic halogenated hydrocarbon and manganese carbonyl is 200-500:1:0.05-0.5.

6. The method according to claim 5, wherein the molar ratio of the vinyl ether monomer, the organic halogenated hydrocarbon and manganese carbonyl is 200:1:0.05-0.5 or 200-500:1:0.2.

7. The method according to claim 1, wherein the polymerization time is 5 min to 5 h.

8. The method according to claim 1, wherein the reaction is performed in an organic solvent.

9. The method according to claim 8, wherein the organic solvent is selected from the group consisting of toluene, n-hexane, ethyl acetate, methylene chloride and any combination thereof.

* * * * *